Figure 1:
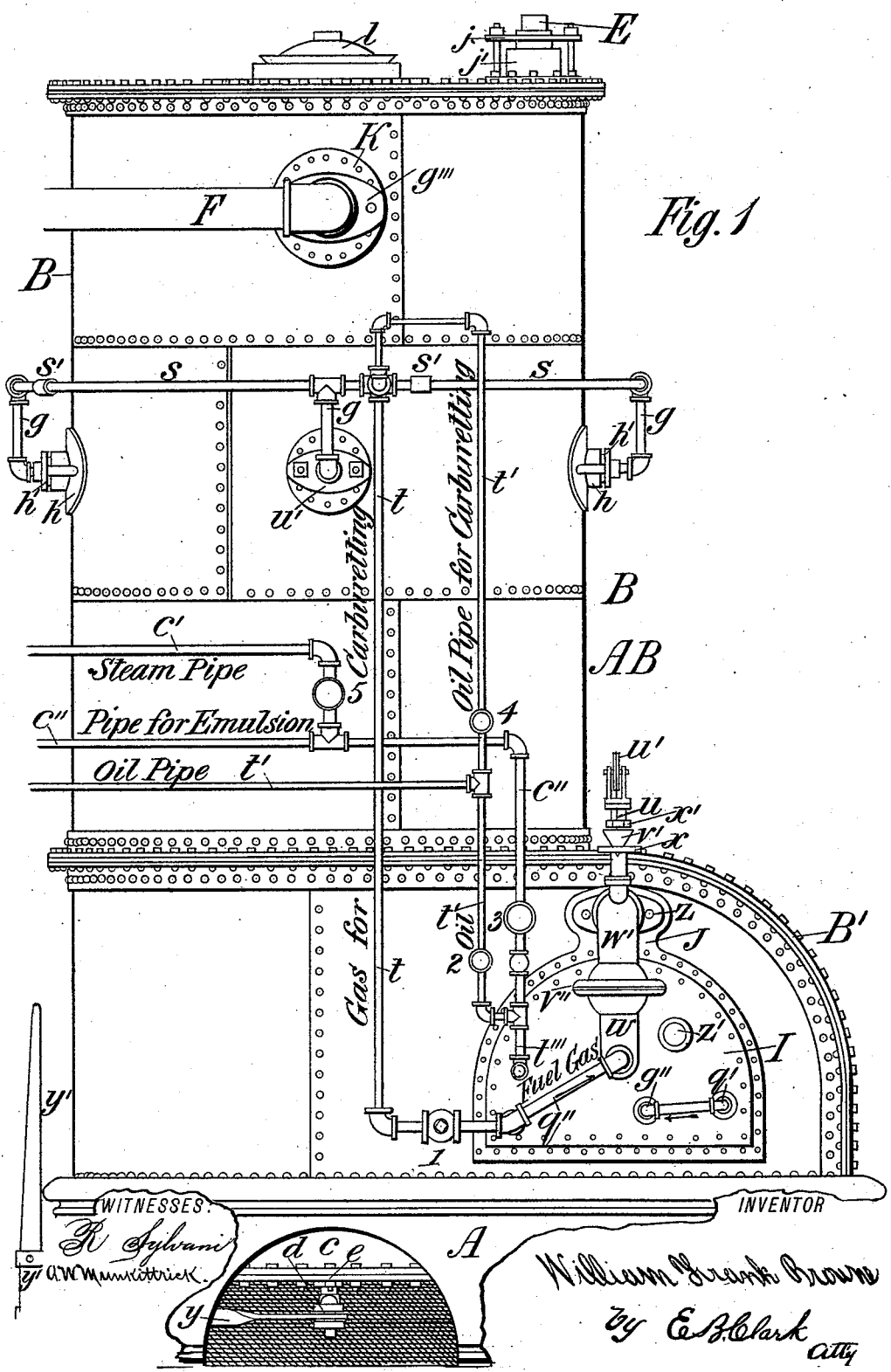

(No Model.) 9 Sheets—Sheet 1.

W. F. BROWNE.
PROCESS OF AND APPARATUS FOR MAKING GAS.

No. 525,131. Patented Aug. 28, 1894.

(No Model.) 9 Sheets—Sheet 2.

W. F. BROWNE.
PROCESS OF AND APPARATUS FOR MAKING GAS.

No. 525,131. Patented Aug. 28, 1894.

(No Model.) 9 Sheets—Sheet 4.

W. F. BROWNE.
PROCESS OF AND APPARATUS FOR MAKING GAS.

No. 525,131. Patented Aug. 28, 1894.

WITNESSES:
R. Sylvani
A. W. Munkittrick

INVENTOR
William Frank Browne
by E. B. Clark
Atty (No Model.) 9 Sheets—Sheet 8.

W. F. BROWNE.
PROCESS OF AND APPARATUS FOR MAKING GAS.

No. 525,131. Patented Aug. 28, 1894.

WITNESSES:

INVENTOR
William Frank Browne
by E. B. Clark
Atty (No Model.) 9 Sheets—Sheet 9.
W. F. BROWNE.
PROCESS OF AND APPARATUS FOR MAKING GAS.
No. 525,131. Patented Aug. 28, 1894.
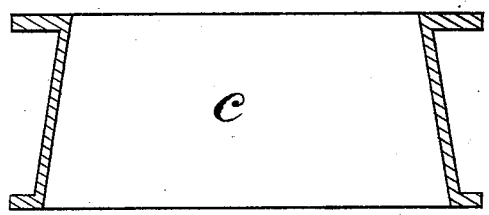
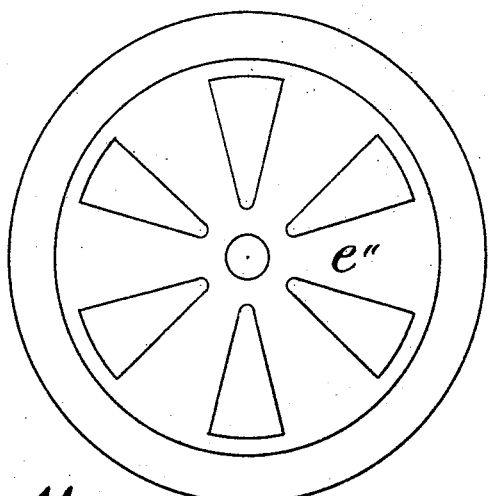
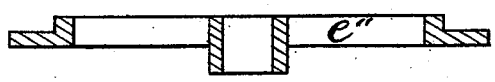
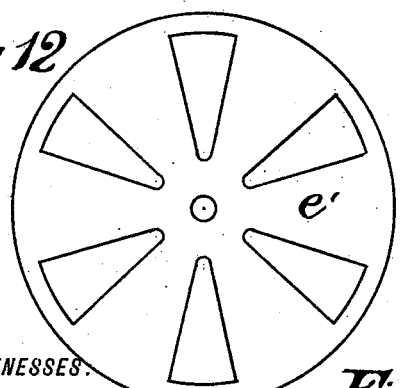
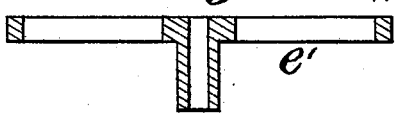

UNITED STATES PATENT OFFICE.

WILLIAM FRANK BROWNE, OF NEW YORK, N. Y.

PROCESS OF AND APPARATUS FOR MAKING GAS.

SPECIFICATION forming part of Letters Patent No. 525,131, dated August 28, 1894.

Application filed April 18, 1891. Serial No. 389,537. (No model.)

*To all whom it may concern:*

Be it known that I, WILLIAM FRANK BROWNE, a citizen of the United States, and a resident of the city, county, and State of New York, have invented a new Compound Process of and Apparatus for Making Gas; and I do hereby declare that the following is a full and clear description thereof, reference being had to the accompanying drawings, which form a part of this specification.

This invention relates to a duplex or compound process and apparatus adapted for carrying out the process of manufacturing heating and illuminating gases.

The object of the invention is to provide for manufacturing gas by supplying combustible carbonaceous matter with or without steam, and a suitable proportion of air or oxygen to a suitable combustion chamber or fire-box for immediate combustion, and passing the resulting products into and through incandescent carbonaceous material, wherein complete oxidation of said material is effected by the oxygen derived from the steam and from the carbon dioxide.

The apparatus embodying the compound or duplex process is preferably embraced in one structure, but two or more structures can be arranged and employed to carry out the said duplex process. The structure embraces a cupola for receiving solid carbonaceous material and an auxiliary combustion furnace or furnaces containing conduits or receivers in which a gaseous vapor or gas is preferably evolved from an emulsion of water and combustible carbonaceous matter, and thence discharged into said furnace or furnaces for immediate combustion, the products of which pass through suitable flues or ports into a body of carbonaceous material in said cupola wherein said products and carbon are converted into combustible gas which escapes through suitable flues, pipes, scrubbers, and purifiers, (when necessary) into a holder.

The operation of making a heating gas consists in first charging the cupola with any suitable carbonaceous material, thence forcing an emulsion consisting of water and combustible carbonaceous matter into heated conduits wherein a gaseous vapor or gas is evolved and thence discharged into and through suitable burners, into the furnace or furnaces wherein combustion of the same is continuously effected, while the flame and products therefrom are being continuously forced through flues or ports communicating with said cupola, at or near the base thereof and thence through the interstices of the carbonaceous material to which their heat is imparted until the mass becomes heated to incandescence, after which continuous oxidation of the said carbonaceous material will be effected, resulting in the generation of gas composed of carbon monoxide, and free hydrogen which is forced therefrom through a suitable condenser, scrubber, and, when necessary, a purifier, to a holder.

In the first stages in the operation of making gas, atmospheric oxygen should be inducted or forced into the furnace in sufficient quantity to burn all of the carbon contained in the emulsion or the gaseous vapor or gas evolved from the emulsion in the above mentioned conduits, for the purpose of heating the interior of the structure, and the carbonaceous material contained therein to incandescence; while, in the meantime, the products of this combustion should escape into the atmosphere, and then, after the required heat is obtained, the gases should be diverted continuously to a holder.

When the heat is in suitable condition a larger proportion of water can be added to the emulsion, or enough to equal ninety to ninety-five per cent. of its weight, which, on being forced into the aforesaid heated conduits, will evolve to a highly heated gaseous vapor or carbon monoxide, free hydrogen and oxygen gases which, on being discharged into the furnace with atmospheric oxygen and ignited produce great heat.

The amount of oxygen required for combustion will be only what is required to combine with the carbonaceous or hydrocarbonaceous matter contained in the emulsion, and as this carbonaceous or hydrocarbonaceous matter need not exceed five per cent. by weight of the emulsion, it will be perceived that but a small amount of atmospheric oxygen will be required for said combustion, while the energy derived therefrom will so far decompose the ninety or ninety-five per cent. of the water used in the said emulsion that the oxygen derived from said water while in its highly heated state, will, when coming in contact with incandescent carbonaceous material, oxidize the same in a continuous and rapid manner, or as would be done by the use of an equal amount of atmospheric oxygen.

The carbon dioxide evolved during combustion will, while passing through the incandescent carbonaceous material, yield one of its oxygen equivalents which combines with another equivalent of carbon, all passing off as carbon monoxide gas combined with free hydrogen and nitrogen gases, and when the carbonaceous material in the cupola is of a hydrocarbonaceous nature, hydrocarbon and carbon monoxide gases more or less carbureted, will be evolved.

It is essential to keep the cupola filled to the top or nearly so, with carbonaceous matter, such as coal, coke, wood, or peat, so that the ingoing carbonaceous matter will become heated by the outgoing gases, while in the meantime there will be sufficient depth of incandescent carbonaceous matter to effect the necessary chemical actions and reactions to insure the production of fixed carbon monoxide and free hydrogen gas; therefore the deeper the column of incandescent carbonaceous matter in the cupola the more perfect will be the resultant gas, or, in other words, if the carbonaceous matter is kept to the required depth and incandescence no carbon dioxide will be made. The quality and quantity of gas made in a given time depend upon the amount of free oxygen evolved or eliminated from the water contained in the emulsion during the preliminary combustion, for the more oxygen derived from this source the more rapid will be the secondary combustion and evolution of gas in the cupola.

When the gas or gaseous vapor is evolved, for preliminary combustion, from suitably prepared solid carbonaceous matter, as powdered anthracite coal, hard coke or peat and water, it will be necessary to support the combustion thereof by the introduction of atmospheric oxygen and with only enough to permit the oxygen contained therein to combine with the carbon contained in the emulsion, but when hydro-carbon oils, or finely powdered bituminous coal, are emulsified with water, enough atmospheric oxygen should be admitted with the gaseous vapor or gas for the complete combustion of the hydrocarbon. When only carbon is emulsified with water, a carbon monoxide gas can be evolved in the heated conduits prior to the discharge thereof into the furnace, thus requiring but one half the volume or weight of atmospheric oxygen that would be required were not the carbon monoxide evolved in the said conduit. The oxygen required for the said evolution of carbon monoxide will, in this instance, be derived from the water contained in the emulsion, thus leaving the other half free to combine with the incandescent carbonaceous matter in the cupola, while the other half, which has combined with the carbon to assist in forming carbon dioxide in combustion, will, on coming in contact with the incandescent carbonaceous matter in the said cupola, combine with its equivalent of carbon and pass away as carbon monoxide gas. Therefore, it will be observed that a carbon monoxide gas and free hydrogen are evolved with a minimum amount of nitrogen, and that the latter can be reduced to less than ten per cent. of the volume of the combined gases, and when carbureted for illuminating purposes the percentage is much less. It is highly advantageous to utilize the highest percentage of water that it is practical to use, and it has been found and proven, after repeated experiments, extending over a period of several years' time, to be practical to utilize from ninety to ninety-five per cent. of water emulsified with ten to five per cent. of hydrocarbon, but when only carbon, such as powdered anthracite coal or coke, is emulsified with the water a greater percentage of carbon is required, but not to exceed, by weight, fifteen per cent.

It is claimed that the heat required to evaporate, decompose, and to hold in disassociation the elements of the ninety or ninety-five per cent. of water is derived from the combustion of the carbon or hydro-carbon contained in the emulsion, and the combining equivalent of atmospheric oxygen to form carbon-dioxide ($CO_2$) and water ($H_2O$) or complete combustion. If the emulsion is evolved to a fixed gas within the heated conduit the resultant gases will be carbon dioxide, free oxygen and hydrogen, thereby leaving only the free hydrogen gas for combustion when discharged into the fire-box, from which a high heat is continuously generated for the production of the gas or vapor in the conduits and for maintaining the incandescence of the carbonaceous matter within the cupola which now becomes oxidized by the free oxygen eliminated from the water and one equivalent of the oxygen occluded in the carbon-dioxide. The result of the first impact of the free oxygen upon the incandescent carbon in the cupola will evolve carbon-dioxide, which, on ascending through the incandescent carbon, yields up one of its oxygen equivalents to another equivalent of carbon, thus evolving two molecules of carbon-monoxide (CO) while at the same time the impact of the carbon-dioxide ($CO_2$) of the said products of combustion upon said incandescent carbon, will result in evolving two molecules of carbon-monoxide (CO); thus it will be seen that all of the oxygen required for combustion, and that derived from the water contained in the emulsion, will combine with the proper equivalent of carbon to form carbon-monoxide prior to the discharge, together with the free hydrogen gas from the cupola.

It is found that it is not necessary to make a fixed gas within the conduits in order to do the work required, for a highly heated gaseous vapor is all that is required for combustion, but in this case there has been no chemical change of the elements forming the emulsion, within the conduits, only a physical change has occurred, but when the gaseous vapor is discharged into the fire-box with the required amount of atmospheric oxygen, a high heat is evolved from the combustion thereof.

The hydro-carbon within the gaseous vapor will combine with its oxygen equivalent of the atmosphere and leave the oxygen and hydrogen elements of the water in a disassociated state but mechanically mixed with the products of combustion, and free to associate or recompose with combining equivalents and form new compounds during the chemical action and reaction while ascending through the incandescent mass of carbonaceous material within the cupola.

It has been claimed that gas cannot be made by the herein described process, for the reason that there will not be heat energy enough derived from the combustion to evolve continuously a gas or gaseous vapor from the ninety to ninety-five per cent. of water and ten to five per cent. of carbon or hydrocarbon, and, if done at all, the process must be intermittent in its action; and that therefore, no economy would result from the use of this process over the old methods of making water-gas, but those claims have been proven to be erroneous, for it has been found and proven by repeated trial that there is an abundance of heat energy for a continuous action so long as the supply of material, equals the demand, and for the reason that the heat required to decompose water and hydrocarbonaceous matter in the conduit has not become radiated therefrom, nor does it remain latent while the chemical changes resulting in the decomposition of said water and hydrocarbonaceous matter are being effected; therefore it is held that there is no latent heat in a fixed gas when heated to the degree of heat required for its decomposition and recomposition: consequently, all of the heat units required for the decomposition of the water and hydrocarbonaceous matter again appear as sensible heat during the period of chemical change, and is immediately transmitted with the gas into the fire box, from whence it was derived, and is utilized with the heat derived from the combustion of said gas for an evaporating or heating agent within the conduits and cupola. Now, if there is no latent heat within the gases and all of the units of heat required for decomposition are again transmitted to the furnace, there is no loss, except that which is radiated through the apparatus. Hence there is no heat lost during the decomposition of water in the presence of hydrocarbonaceous matter when done by the herein described process for immediate combustion.

I will now particularly describe my process and apparatus by reference to the accompanying drawings, in which—

Figure 2:
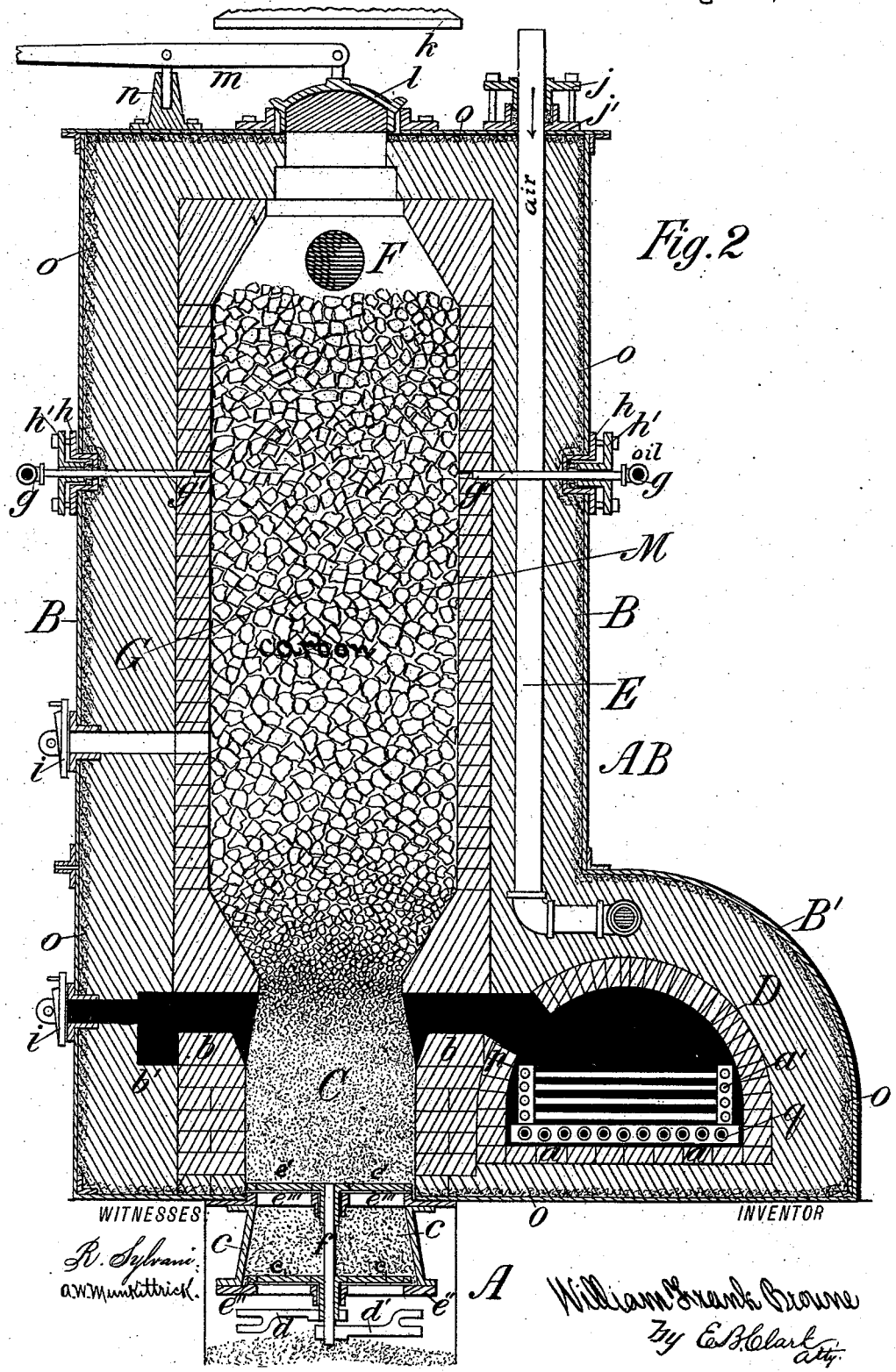
Figure 3:
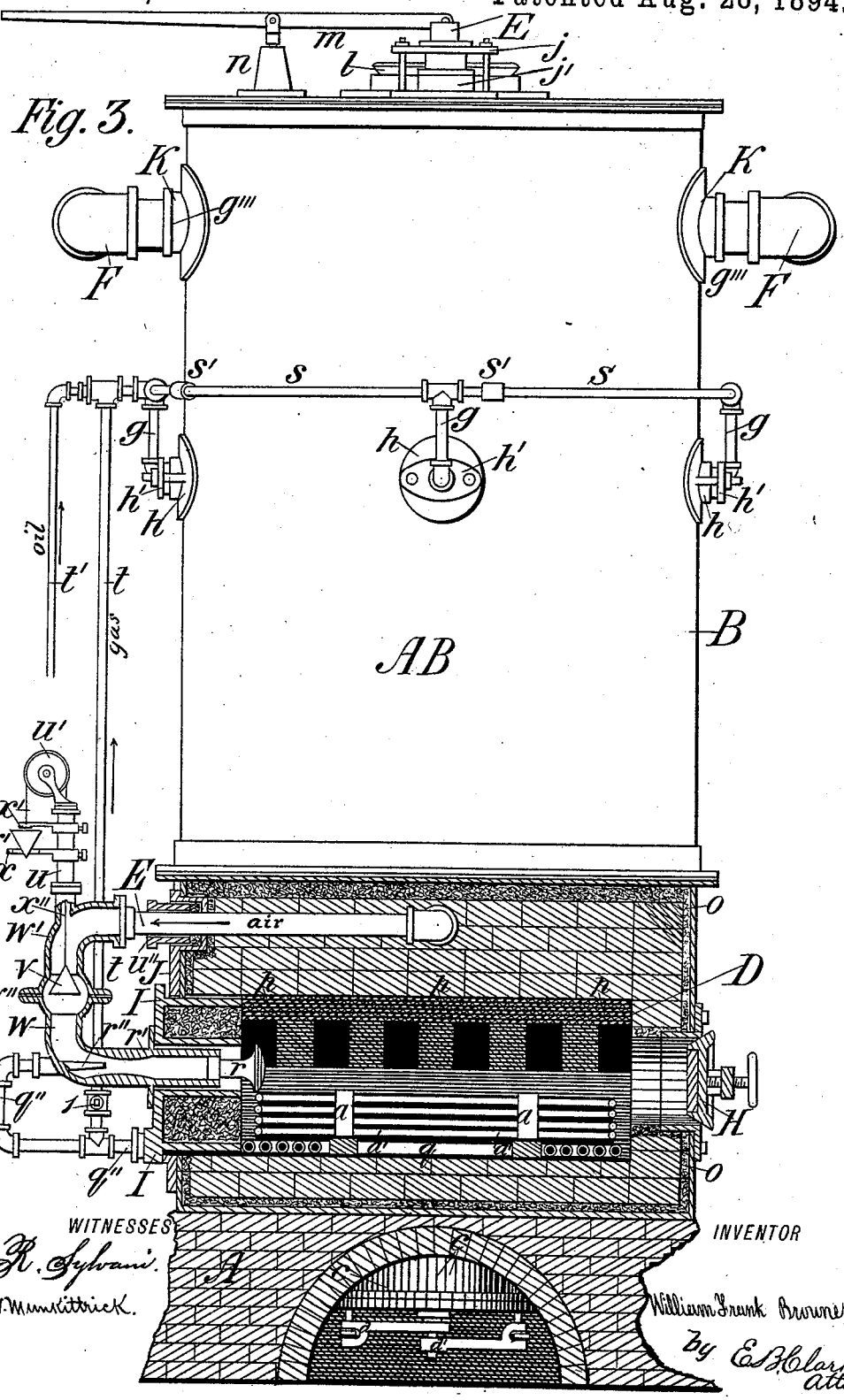
Figure 4:
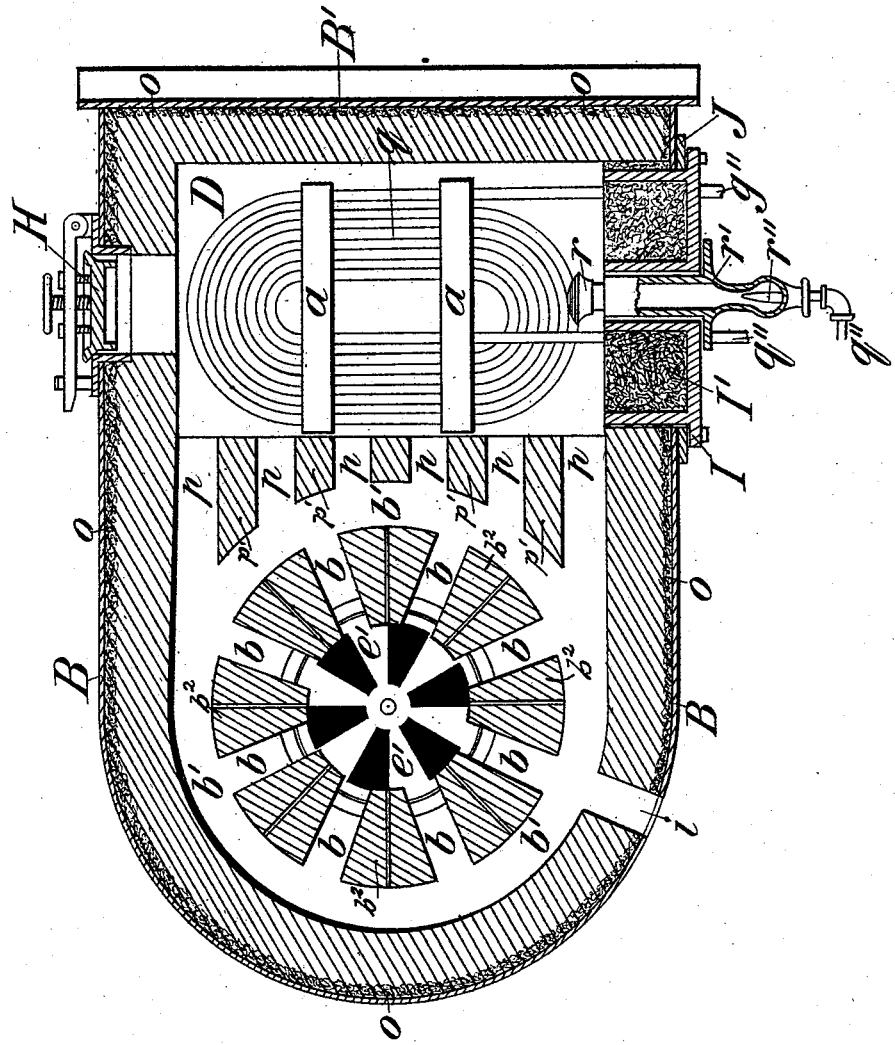
Figure 5:
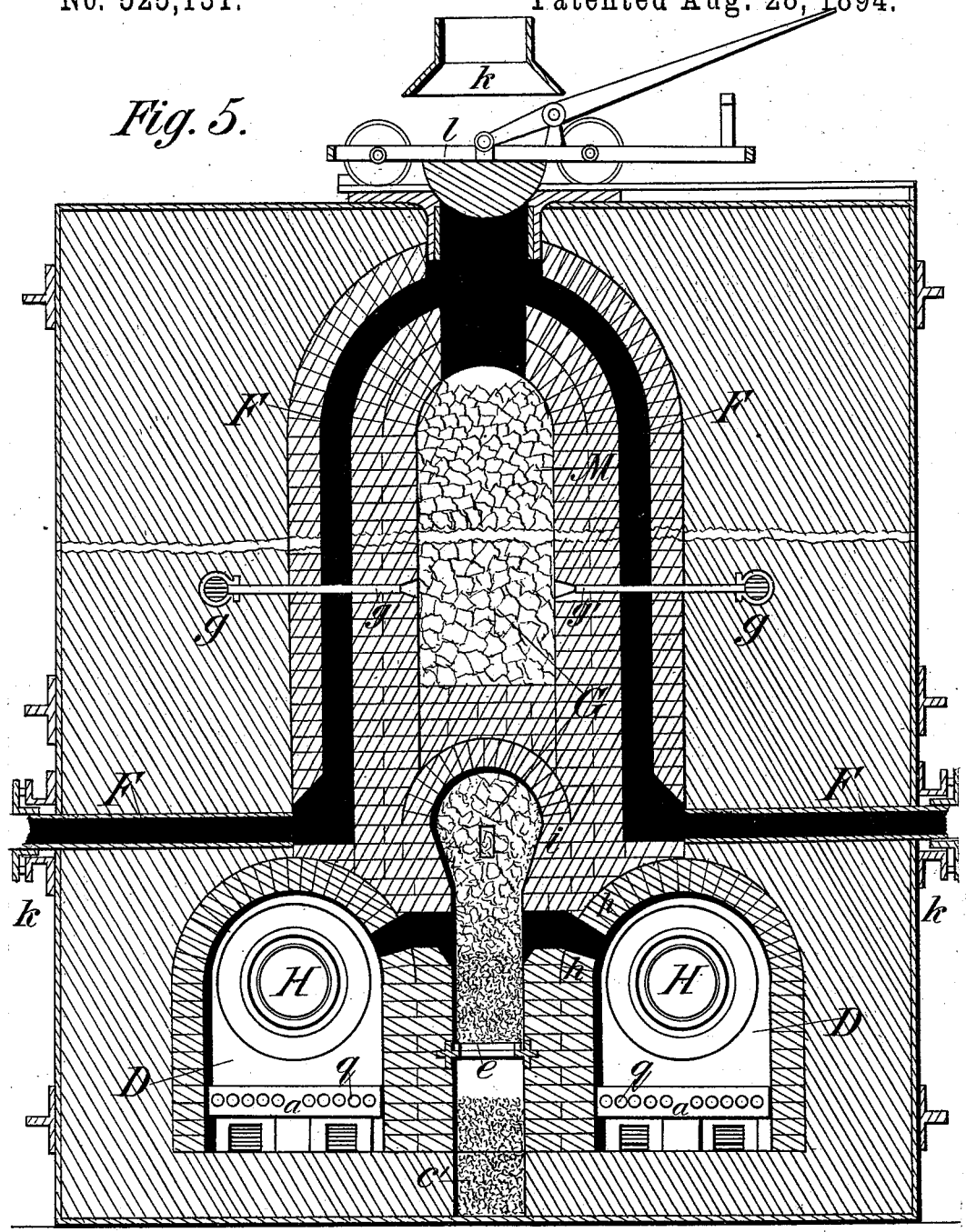
Figure 6:
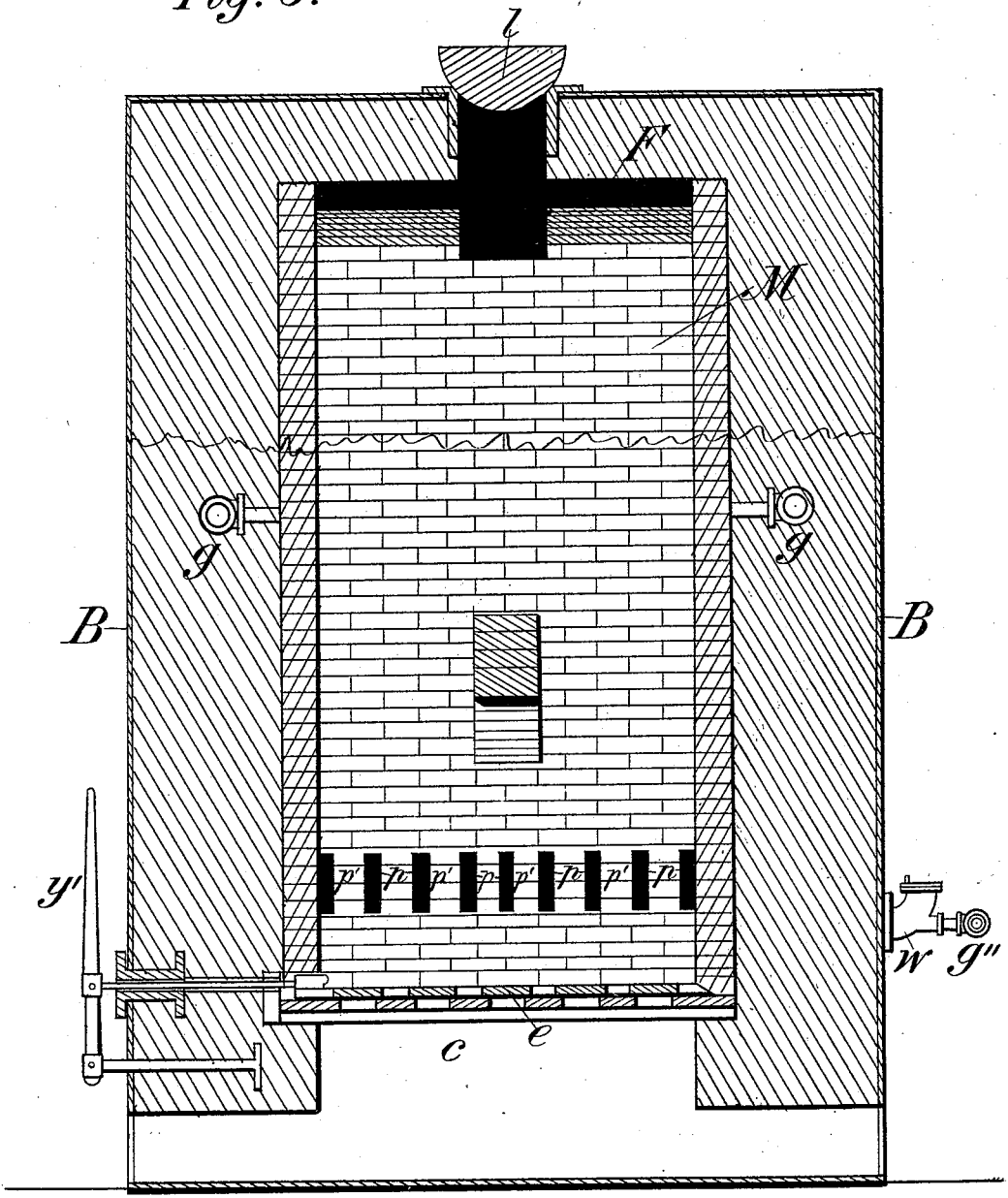
Figure 7:
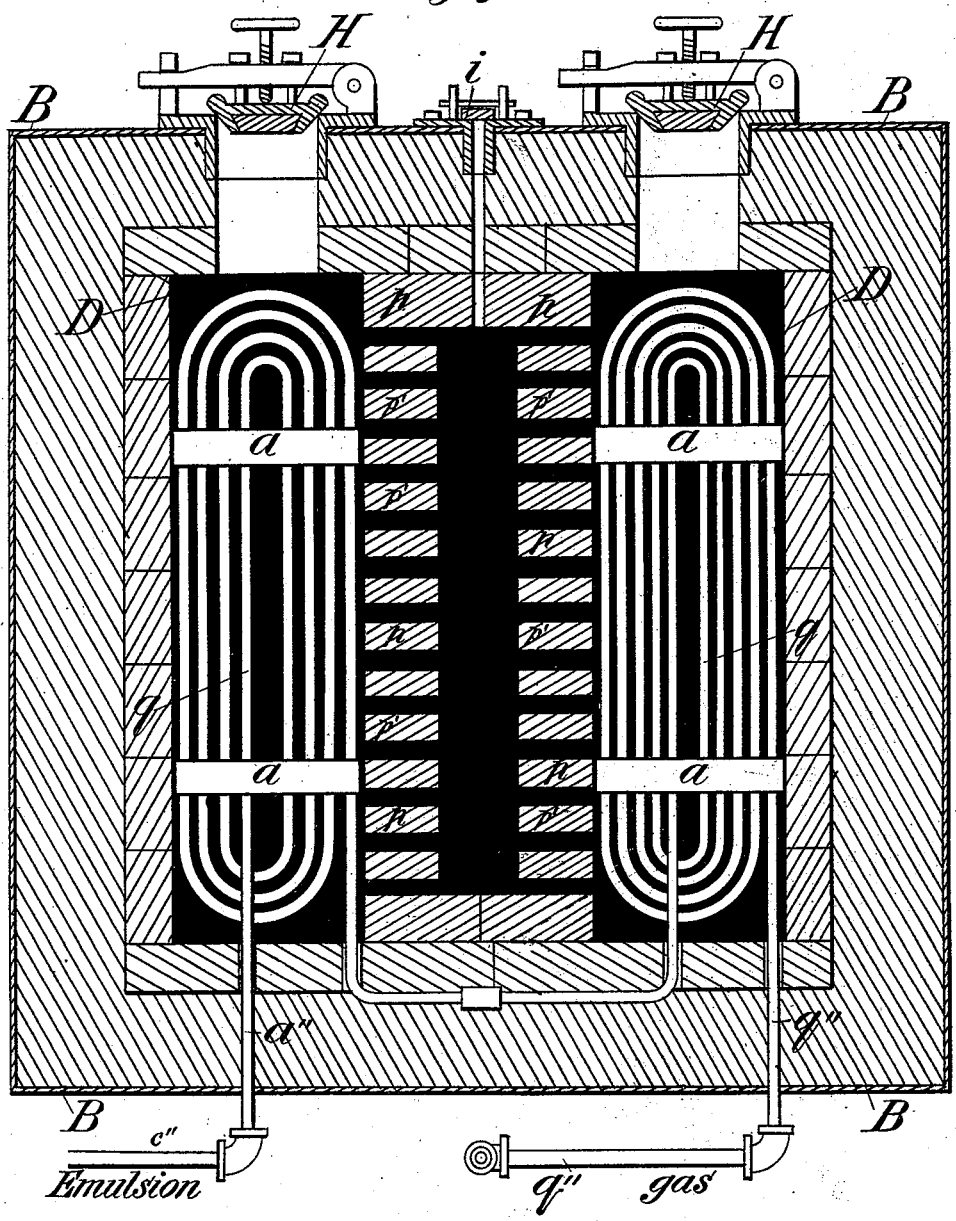
Figure 8:
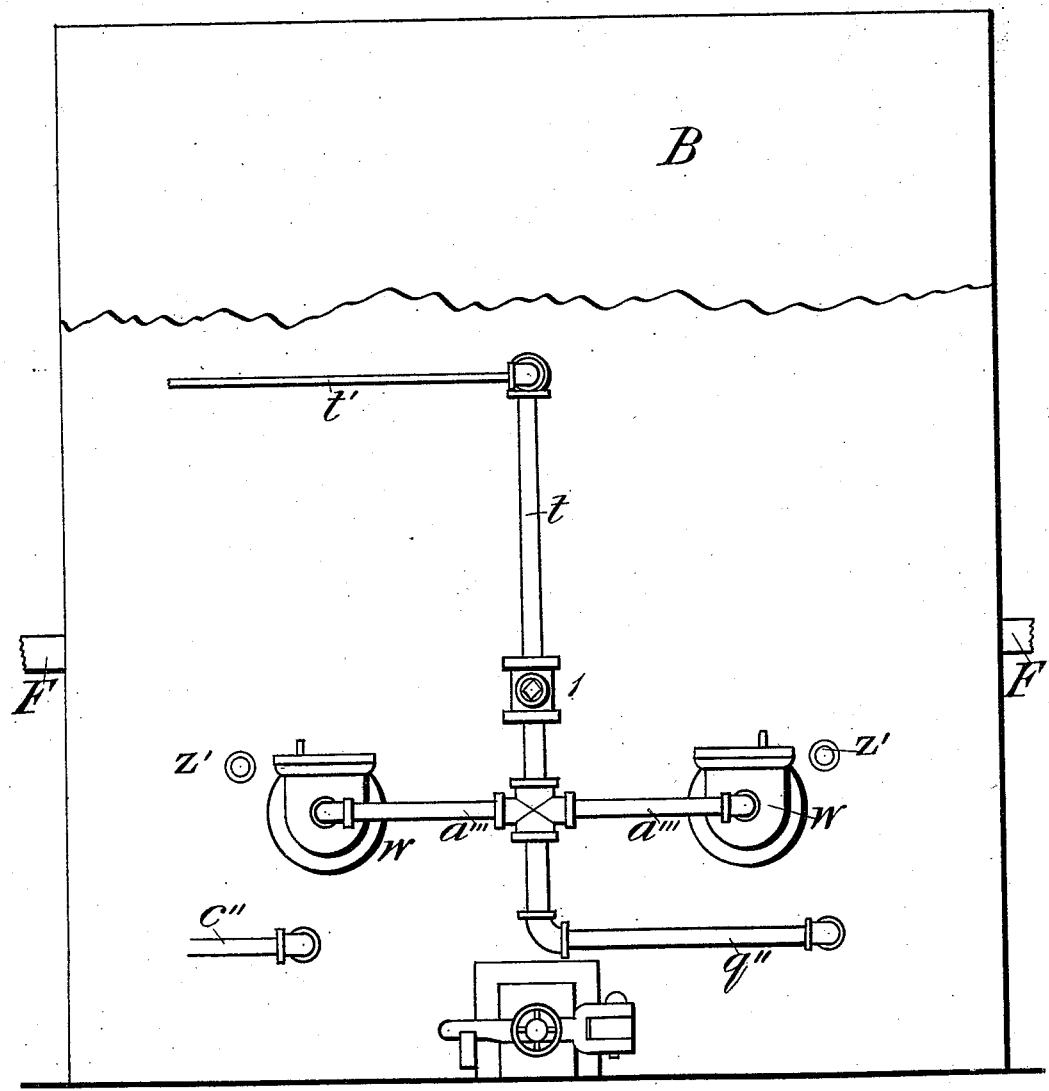

Figure 1 represents a front elevation of a gas generating apparatus. Fig. 2 represents a vertical central section of Fig. 1. Fig. 3 represents a side elevation of the cupola and vertical central sectional view of the auxiliary combustion furnace of a gas generating apparatus. Fig. 4 represents a horizontal sectional view of a gas generating apparatus cutting through the auxiliary combustion furnace on a line with its flues leading therefrom to and through the flues connecting with the cupola of the said gas generating apparatus. Fig. 5 represents a vertical central section of a gas generating apparatus showing auxiliary combustion furnaces on opposite sides of the cupola. Fig. 6 represents a vertical central sectional view of a gas generator on a plane, at right angles to the view shown in Fig. 5. Fig. 7 represents a horizontal sectional view of Fig. 5 cutting through the two auxiliary combustion furnaces on the line of their flues which connect with the cupola. Fig. 8 represents an external elevation of a gas generating apparatus showing pipe connections. Figs. 9, 10, 11, 12, 13, 14, 15 and 16 represent the parts in detail of an ash pit and gates thereto for removing ashes while gas is being made in the generator.

The gas generator shown in Figs. 1, 2, and 3, rests upon a suitable foundation, A, and is provided with an iron jacket, B, which is made gas-tight under a pressure of one-hundred pounds and upward to the square inch; within this jacket, the cupola M and furnace or furnaces D, are built of suitable refractory material molded in suitable forms, and between this refractory material and the iron jacket a suitable lining of magnesia, $o$, or other non-conducting material is introduced to prevent heat from escaping through jacket B. The jacket is provided with apertures into which are fitted suitable stuffing boxes, $h$, K, and $j'$. Pipes, $g$, E and F project through the shell or jacket and stuffing boxes and are packed tightly by means of asbestos and the glands $h'$, $j$ and $g'''$.

The furnaces D, are provided with coils, $q$ and $a'$, which are provided with straps or binders, $a$, which are bolted to or cast therewith for the purpose of keeping the coil in place when highly heated and under high pressure. The back ends of the furnaces are provided with doors H, which are forced to a joint by means of a screw provided with a wheel or lever. The front end of the furnace shown in Figs. 1, 3 and 4, is provided with an iron door, I, made in suitable form and with the necessary apertures for pipes $q'$, $g''$, $q''$ and $t'''$, also the inlet air and gas pipes $w$; this door is bolted to a flange, J, which in turn is bolted to the iron jacket B, all joints being made perfectly tight by means of asbestos. Flange J is provided with a stuffing box and gland $u''$, through which air pipe E projects and is connected to elbow, $w'$, which in turn is connected by flange, $v''$, with elbow $w$, having the burner head $r$, and jet nozzle $r''$. The balanced air gate $v$, shown in Fig. 3, is for the purpose of controlling the amount of air inducted to the furnace by the jet of gas issuing from nozzle, $r''$, and closes by the back pressure of the gas in the generator, thus preventing the escape of gas up through the air pipe E,— the counter weight V′ assisting in closing the same. The cord, $x''$, shown in Fig. 3, connecting gate valve, $v$, and counterweight $v'$, passes through standard $u$, and over pulley $u'$, and the counter weight moves between the two adjustable guide stops $x$ and $x'$. The lower stop, $x$, consists of a ring the diameter of which equals the outlet of elbow, $w'$; therefore, as the gate and counter weight are equal in form and area the position of gate valve, $v$, is indicated at all times.

The atmospheric oxygen required for preliminary combustion is drawn down through pipe, E, by the jet of gas issuing from nozzle $r''$, and thence forced, in their mixed condition, through burner, $r$, shown in Fig. 3, into furnace D, wherein combustion of the same is effected, the products from which escape through flues $p$, leading from beneath the arch in the furnace, into flues $b'$, which pass around the cupola M, shown in Fig. 4, and from thence through flues, $b$, into said cupola, thence upward through the carbonaceous material where decomposition and recomposition are effected, and the resulting gas finally passes off through eduction pipes or flues F. The above-mentioned flues, $b$ and $p$, formed in the brick work leave the intermediate supporting columns or bars, $p'$, $b^2$, of brick or other refractory material between the auxiliary combustion chamber, D, and the cupola, M, or compartment containing the carbon in fragments, and such columns serve to hold in place the broken carbon, while permitting the flame and gases from the auxiliary combustion chamber to impinge on said carbon, all as clearly shown in Figs. 3 and 4.

The gas or gaseous vapor for preliminary combustion is evolved in conduits $q$ and $a'$, preferably from an emulsion consisting of water and any liquid hydrocarbon, or of water and powdered carbon, such as anthracite coal, bituminous coal, or peat. The emulsion can be drawn to and forced from a pump through pipes into suitable conduits or coils $q$ and $a'$, connected therewith in the auxiliary combustion furnace D. The preliminary heat is at first obtained by throwing some oily waste or some light combustible matter through door H, on to the hearth of furnace D, then igniting the same, after which the valves 3 and 5, on pipes $c$ and $c''$, and valve 2 on oilpipe, $t'$, are opened, thus allowing steam and oil to be forced into and through conduits $a'$ and $q$, and the resulting vapor from thence through nozzle, $r''$, into and through burner, $r$, to the furnace where it will ignite from the burning waste and produce heat which will heat the conduits to the degree required to evolve a gaseous vapor or gas from an emulsion of water and hydrocarbon or powdered carbon, which can now be forced in through pipe $c''$, into the induction end, $t'''$, of conduit, $a'$, from whence it is forced from the eduction end, $q'$, into induction end $g''$, of conduit, $q$, from whence it is discharged in the form of a gaseous vapor or gas through pipe $q''$ and nozzle, $r''$, into and through burner $r$, into furnace D. Valves 5 and 2 on steam and oil pipes $c'$ and $t'$ must be closed before the emulsion is forced into the conduits.

Whenever it is necessary to carburet the carbon monoxide and hydrogen gas, it can be done by forcing hydro-carbon liquids through pipe $t'$, into pipe $s$, from whence it is distributed and forced through several pipes, $g$, into the interior of the cupola. An additional force is imparted to the liquid hydrocarbon by a jet of gas or gaseous vapor which is forced from the conduits on opening plug cock $l$, up through pipe, $t$, into pipe, $s$, where it mingles with and atomizes the liquid hydrocarbon prior to the discharge of the same into the cupola.

Other conduits can be employed either connected to, or with the apparatus A B, or externally thereto and be used exclusively for the purpose of carbureting the gas evolved in furnace or furnaces D and cupola M, and also this gaseous vapor or gas can be sufficiently enriched with hydrocarbon to furnish all of the bi-carburetted hydrogen for any candle power desired. This method of forcing hydrocarbon and water into heated conduits and discharging the resultant gas into incandescent material for enriching or carbureting the gas generated therein is an important feature of the herein described invention. The gas is forced by the jet issuing from nozzle, $r''$, under high pressure from the apparatus through pipes F, to and through scrubbers and purifiers, when required, and thence into a holder.

Instead of supplying an emulsion of water and hydrocarbon or powdered carbon to the coils, $a'$ and $q$, steam and oil only may be supplied through pipes, $c'$, $c''$, and $t'$, and evolved into a gas or gaseous vapor, which is discharged through the nozzle $r''$, and burned with a suitable air supply at the burner, $r$,— and the flame and resulting products pass into the body of carbonaceous material in the cupola, M, for heating the same to incandescence and generating fuel-gas.

In carrying out my invention, I also force hydrocarbon oil alone through the coils, $a'$ and $q$, generating a vapor therefrom and discharge such vapor through the nozzle $r''$, thereby drawing in a sufficient supply of air through pipe E, and burn the mixture at the burner, $r$, the resulting flame or products being utilized for maintaining the heat of the coils, and then passed from furnace D, into the body of carbonaceous material in the cupola, heating the same to incandescence, and by continuing the flame and products generating a combustible gas in said body of carbonaceous material. In the above operation, the gaseous products may, at first, be allowed to escape from the top of the cupola until the carbonaceous material is heated to incandescence, after which the gas is conducted off through pipes F, to a storage holder or to a furnace for immediate use.

Gas made by passing steam and oil through the conduits, or by passing oil alone through such conduits and burning the resulting vapors and completing the operation in the body of incandescent carbon, may be carbureted in the cupola chamber, as before described with reference to the gas made from an emulsion of water and hydrocarbon or powdered carbonaceous material.

An ash pit, $c$, shown in Figs. 2 and 9, is fitted and bolted to the bottom of the cupola; the main body of the ash-pit, $c$, is provided with heads, $e''$, $e'''$, which have openings corresponding with openings in two gates, $e$ and $e'$, which are fitted to close gas tight. The upper gate, $e'$, has attached thereto a sleeve which fits into the central opening in the upper head, $e'''$, and a mandrel or shaft, $f$, is fitted to said sleeve and projects downward through the bottom gate, $e$, which is also provided with a sleeve which fits into the central opening of the bottom head, $e''$, in which said mandrel, $f$, fits loosely, so that the upper gate can be rotated while the bottom one remains idle. The sleeve which projects from the lower gate $e$, projects far enough beyond the bottom head to admit of attaching a lever, $d$, thereto, while the mandrel, $f$, projects far enough to receive lever $d'$. The gates, $e$, $e'$, are rotated by means of the handle or lever $y'$ and connecting bar, $y$, engaging with lever $d$ or $d'$ as shown in Fig. 1. In order to remove the ashes from the cupola, the top gate, $e'$, must be rotated, thus letting the ashes fall into pit, $c$, and after the pit is filled, the top gate, $e'$, is closed, and the bottom gate, $e$, rotated, thereby discharging the ashes therefrom. Thus by a judicious use of the two gates the ashes can be removed from the cupola without interrupting the process of making gas. Openings, $i$, through case, B, leading to the cupola are for the purpose of observing the condition or incandescence of the carbonaceous matter and for probing, if the said carbonaceous matter should at any time become hung or clogged.

A square form of the generator is shown in Figs. 5, 6, 7, and 8, and the vertical section Fig. 5, shows the two furnaces D, with conduits, $q$, therein. The two doors H at the back end of the furnace are closed tightly each by means of a cotter bar and lever or wheel, as shown in Fig. 7. The flame and products of combustion evolved in the two furnaces D, are forced through flues, $p$, which connect with the cupola M, and have between them the intermediate supporting columns of brick work, $p'$, as shown in Figs. 5, 6 and 7. The cupola is charged with carbonaceous material through the opening in the top of the structure, which opening is covered with a lid $l$, fitting gas tight, and is connected to a lever for raising and lowering the same when necessary. Stack, $k$, is for conducting away the products from the cupola when the lid is raised, and when the lid is lowered the said products are diverted down through flues F to a scrubber and thence to a holder. The pipes, $g$ $g$, are for conducting hydrocarbon liquid to the cupola for the purpose of carbureting the water-gas made in the cupola. The ashes are removed by means of a sliding gate $e$, which is operated by lever $y'$, as shown in Fig. 6, which is a vertical section cutting at right angles Figs. 5 and 8, and showing the brick columns $p'$ and flues $p$, leading from the right hand furnace.

In the horizontal section view shown in Fig. 7, the two furnaces D are shown with conduits $q$, therein which are connected in the wall by a suitable coupling, thus making practically one conduit. The conduit is provided with straps $a$, cast thereto, for keeping the turns of said conduit in place. The emulsion is forced through pipe $c''$, into conduit $q$, and the resulting gas or vapor discharged from thence through pipes $q''$ and $a'''$, and thence through nozzle, $r''$ and burner, $r$, as shown in Figs. 3 and 4 into the furnace. Atmospheric oxygen for supporting the combustion of said gas or gaseous vapor is inducted in through the air registering head $w$, by means of which the requisite quantity of air for complete combustion can be inducted by the force derived from the discharge of the gas from nozzle $r''$. The cupola M, is contracted at or near its base to about one half of its diameter, for the purpose of concentrating the flame issuing from the flues $p$, between the supporting columns $p'$, of refractory material, the effect being similar to a blow pipe flame, while at the same time the flame comes in equal contact with all of the carbonaceous matter that may descend to the point of contact of said flame. This feature has been found to be highly advantageous, for by this arrangement no fixed carbon can pass beyond or below the flues $p$. Sight holes $z'$, are provided for each combustion furnace for observing the condition of the flame at all times.

The structure is built of suitable refractory material incased in iron, and when built in square form it will have to be provided with buck stays to resist the internal pressure, but when the round form is built, the structure will be self-sustaining, and also it is not necessary to build the square form as shown in order to connect therewith two auxiliary combustion furnaces, for two such furnaces can be applied to the round form as well as the single furnace shown in Figs. 1, 2, 3 and 4. The operation for manufacturing gas in the two structures is the same, the only difference between the two, being in form, while the principle and operation are the same.

The gas made in the apparatus herein described, is made under a high pressure, the pressure being derived from the generative force due to the continuous expansion of the emulsion to a gaseous vapor or gas in a closed receiver, from whence the gas or gaseous vapor is discharged into the fire-box for immediate combustion which is effected under a pressure equal to the resistance opposed to its discharge from the apparatus; this resistance may, if required, be one hundred pounds and upward to the square inch, as might be the case, when required to be forced through pipes of great length. This gas or gaseous vapor which is made in the conduits is evolved under a high pressure of from one to two hundred pounds per square inch, which when discharged from a proper injector nozzle will resist a back pressure approximating the pressure of the gas or gaseous vapor as it issues from the burner into the furnace, or, in other words, the area of the outlet of the burner should equal the area of the cross section of the air pipe into which the gas or gaseous vapor is discharged, hence the resistance of the back pressure can nearly equal the pressure of discharge from the air pipe, which will be as the square of the diameter of the nozzle is to the square of the diameter of the air pipe, or the pound pressure at the nozzle divided by the number of times the area of the nozzle is contained in the area of the said air pipe, and at the same time draw and force enough atmospheric oxygen therewith into the furnace for complete combustion of all of the carbon or hydrocarbon element contained in the gaseous vapor or gas.

By the herein described means, gas can be transmitted over long distances and in sufficient volume to supply cities, towns and villages for heat and light.

Having described my invention, what I claim, and desire to secure by Letters Patent, is—

1. The process of manufacturing gas which consists in first subjecting a mass of carbon contained in a suitable apparatus to the direct action of a flame or flames from an independent primary supply of burning hydrocarbon until the said mass of carbon is heated to incandescence, then continuing such flame or flames and passing the products of combustion through the incandescent material and collecting the resulting gas.

2. The process of manufacturing gas which consists in subjecting a mass of carbon contained in a suitable apparatus to the direct action of a flame or flames from burning hydrocarbon accompanied by steam until the said carbon is heated to incandescence then continuing the flame or flames, and passing the products of combustion through the incandescent material, and collecting the resulting gas.

3. The process of manufacturing gas, which consists in first subjecting a mass of carbon contained in a suitable apparatus to the direct action of a flame or flames from an independent primary supply of burning carbonaceous material until the said mass of carbon is heated to incandescence, then continuing such flame or flames and passing the products of combustion continuously through the incandescent material and collecting the resulting gas.

4. The process of manufacturing gas which consists in heating a mass of carbon contained in a suitable apparatus to incandescence, then continuously passing the flame or flames and products from an independent and primary supply of burning carbonaceous material through said incandescent carbon and collecting the resulting gas.

5. The herein described process of making gas which consists in first producing a gas or gaseous vapor by forcing an emulsion of water and hydrocarbon into heated conduits, then forcing the resultant gas or gaseous vapor from said conduits into a furnace and burning and decomposing it, thence passing the resulting flame and products into heated incandescent carbonaceous matter, whereby such matter becomes oxidized by the free oxygen contained in said products of combustion and decomposition and conducting off the resulting gas.

6. The process of disassociating the elements of water for the purpose of utilizing the oxygen thereof for oxidizing carbonaceous matter and producing a heating gas, which consists in discharging a gaseous vapor from water and carbonaceous matter into a highly heated flame wherein the said vapor becomes decomposed, and continuously passing the resulting hot products into a mass of incandescent carbon and conducting off the resulting gas.

7. The herein described process of making and distributing gas under pressure which consists in forcing an emulsion of water and carbonaceous matter through heated receivers or conduits, thereby generating a gaseous vapor under high pressure,—discharging such vapor, together with a supply of air, into a heated furnace and therein burning the carbonaceous matter of the gaseous vapor and disassociating the oxygen and hydrogen,—forcing these hot gases and products of combustion directly into a body of incandescent carbonaceous material, thereby oxidizing said material and forming carbon monoxide and forcing the resulting mixed gases out of the generator.

8. The process of manufacturing gas which consists in first generating heating gas in a body of incandescent carbonaceous material, then carbureting such gas by forcing hydrocarbon liquid by means of highly heated gas or gaseous vapor into said body of carbonaceous material and mixing the resulting hydrocarbon vapor with said heating gas.

9. The process of manufacturing gas which consists in forcing water and carbonaceous matter through heated receivers or conduits, burning the resulting gas or gaseous vapor and passing the hot products into a body of incandescent carbon, thereby making water-gas, and at the same time carbureting such gas by forcing hydrocarbon into said body of carbon.

10. A gas generator having a combustion chamber in which hydrocarbon is burned, with or without the addition of steam, and which connects with a cupola or compartment for containing carbon in fragments, which compartment is separated from the said combustion chamber by a series of columns or bars made of refractory material, the said columns or bars being so constructed as to hold in place the broken carbon, while permitting the flame and gases from the burning hydrocarbon to impinge on the carbon, substantially as shown and described.

11. In combination with a closed cupola gas generator containing carbonaceous matter, an auxiliary combustion furnace, a series of columns or bars forming flues or ports between said combustion furnace and the base of the cupola, a series of conduits or coils arranged in the combustion furnace, pipes for supplying the conduits with carbonaceous matter and water or steam, and a pipe connecting the conduits with the interior of said auxiliary combustion furnace for burning the gaseous vapor generated in said conduits, substantially as described.

12. In combination with a cupola generator in which gas is generated under pressure, the suspended ash-pit, provided at top and bottom with fixed heads, $e''$ and $e'''$, having openings, in combination with an upper rotatable gate, $e'$, having openings registering with the openings in the top head and fitting air tight thereto, a lower rotatable gate, $e$, having openings registering with the openings of the bottom head and a downwardly projecting sleeve, a central shaft, $f$, secured to the upper gate and passing loosely through the sleeve of the lower gate, and levers connected respectively to said sleeve and shaft for independently turning said upper and lower gates, substantially as described.

WILLIAM FRANK BROWNE.

Witnesses:
R. J. BEALL, Jr.,
APPLETON P. CLARK.